United States Patent [19]

Shavit et al.

[11] Patent Number: 4,810,100
[45] Date of Patent: Mar. 7, 1989

[54] ULTRASONIC ENERGY TRANSFER SENSING SYSTEM

[75] Inventors: Gideon Shavit, Highland Park; Louis S. Smulkstys, Arlington Heights, both of Ill.

[73] Assignee: Honeywell Inc., Minneapolis, Minn.

[21] Appl. No.: 615,447

[22] Filed: May 30, 1984

Related U.S. Application Data

[63] Continuation of Ser. No. 399,653, Jul. 19, 1982, abandoned.

[51] Int. Cl.$^4$ .................. G01K 17/08; G01K 11/22
[52] U.S. Cl. ............................. 374/40; 165/32; 374/117
[58] Field of Search ............... 73/861.27, 861.28, 112; 374/39, 41, 40

[56] References Cited

U.S. PATENT DOCUMENTS 4,145,922 3/1979 Estrada Jr. et al. ................ 73/597

FOREIGN PATENT DOCUMENTS 808854 2/1981 U.S.S.R. ................. 73/861.28

Primary Examiner—Daniel M. Yasich
Attorney, Agent, or Firm—Donald J. Lenkszus

[57] ABSTRACT

A system is disclosed for determining the energy transfer across a heat exchanger having an upstream side and a downstream side and mounted within a conduit through which fluid flows, the system including an ultrasonic transmitter for transmitting ultrasonic waves through the conduit on the upstream and downstream sides of the heat exchanger, an ultrasonic receiver for receiving the ultrasonic waves on the upstream and downstream sides of the heat exchanger, the receiver providing signals indicative of the temperature difference between the fluid upstream and downstream of the heat exchanger and the velocity of fluid flow through the conduit and a processor connected to the receiver for determining energy transfer between the heat exchanger and the fluid based upon the signals indicative of the temperature difference and the velocity.

8 Claims, 3 Drawing Sheets

ULTRASONIC ENERGY TRANSFER SENSING SYSTEM

This application is a continuation of application Ser. No. 399,653, filed July 19, 1982, now abandoned.

BACKGROUND OF THE INVENTION

The present invention relates to a system for measuring the energy transfer between a heat exchanger and a fluid, such as air, moving through a conduit, such as a duct, in which the heat exchanger is located and, more particularly, to a system for ultrasonically sensing the temperature of the fluid on each side of the heat exchanger and for sensing the velocity of the fluid moving through the conduit so that the energy transfer across the heat exchanger can be determined.

The present cost of energy and the projection of energy costs into the future has increased the need for air conditioning systems which result in more savings in energy. Most present day air conditioning control systems, particularly automation systems, are equipped for energy management. Such energy management systems attempt to control conditions within the building at a level which is comfortable for the inhabitants of the building while at the same time minimizing the amount of energy necessary to maintain comfort within the building. Thus, such energy management systems must monitor the energy usage of the air conditioning system, conserve that energy, and, when desired by the user of the building, provide a report of the building's energy usage to the building user.

The measurement of energy usage in a building is the key for any successful energy management system. The process of heating and air conditioning in most building applications involves transfer of energy from air to water or from water to air. As an example, most large commercial buildings have a central chilling plant which chills water for distribution to rooms throughout the building. These rooms are supplied with air through ducts in which are located the fans to drive the air and the heat exchangers to either heat or cool the air. The water from the chiller then flows through the heat exchanger over which air is passed in order to cool the air for supply to the rooms. Similarly, in a heating application, the heating plant delivers hot water to the heat exchanger which then heats the air moving through the duct for supply to the rooms.

In order to accurately and adequately determine the energy which is being consumed in controlling the air at conditions which are comfortable for the occupants of the building, it is not only necessary to measure the amount of electricity and fuels for supplying the heating and chilling plants of the building, but it is also necessary to measure the heat transfer across the heat exchanger located within the ducts supplying treated air to the building. If this energy transfer is known, then it can be determined whether or not the water is cold enough or hot enough to satisfy the comfort level requirements of the building and whether or not the heating plant or the cooling plant is operating at an efficiency to minimize energy consumption and, therefore, energy cost. The present invention is directed to an arrangement for measuring the energy transfer across a heat exchanger located within an air conditioning duct in the building so that it can be determined how much energy is being transferred from the heat exchanger to the fluid or air moving through the duct.

SUMMARY OF THE INVENTION

The present invention, therefore, involves a system for determining the energy transfer across a heat exchanger having an upstream side and a downstream side and mounted within a conduit through which fluid flows and includes an ultrasonic transmitter for transmitting ultrasonic waves through the conduit on both the upstream and downstream sides of the heat exchanger, an ultrasonic receiver for receiving the ultrasonic waves on both the upstream and downstream sides of the heat exchanger, the receiver providing signals indicative of the temperature difference between the fluid upstream and downstream of the heat exchanger and the velocity of the fluid flow through the conduit and a processor connected to the receiver for determining the energy transfer between the heat exchanger and the fluid based upon the signals indicative of the temperature difference and the velocity.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
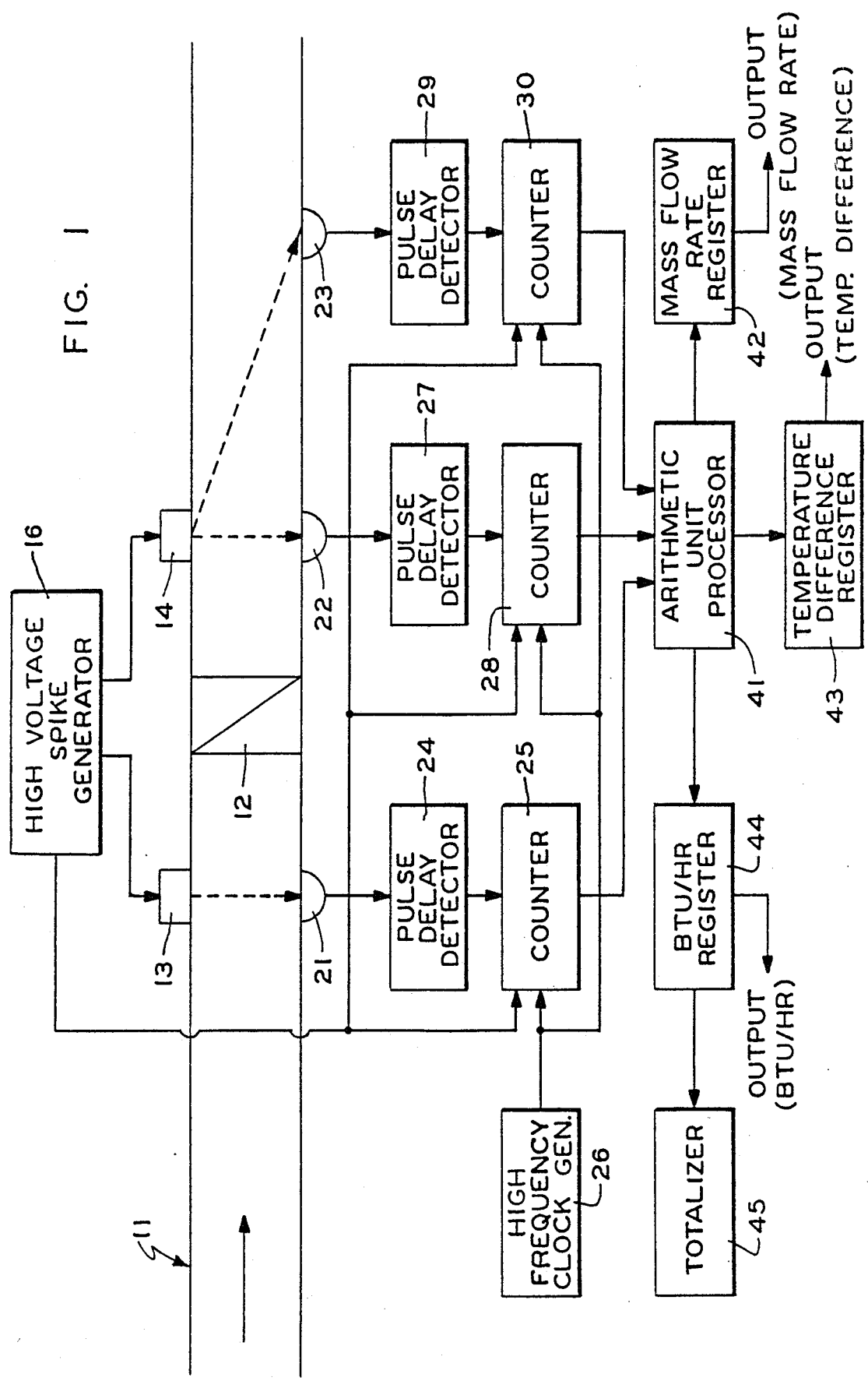
FIG. 1 is a schematic diagram showing the invention.

In FIG. 1, conduit 11, which may be an air conditioning duct in a building for supplying treated air to the rooms of the building, has fluid (e.g. air, water, or the like) moving through it in the direction of the arrow and has within it heat exchanger 12 which may be connected to a chiller plant for receiving chilled water and/or a heating plant for receiving heated water in order to chill or heat the fluid moving through duct or pipe 11. Mounted on one side of conduit 11 is an ultrasonic transducer 13 upstream of heat exchanger 12 and an ultrasonic transducer 14 mounted downstream of heat exchanger 12.

Figure 2:
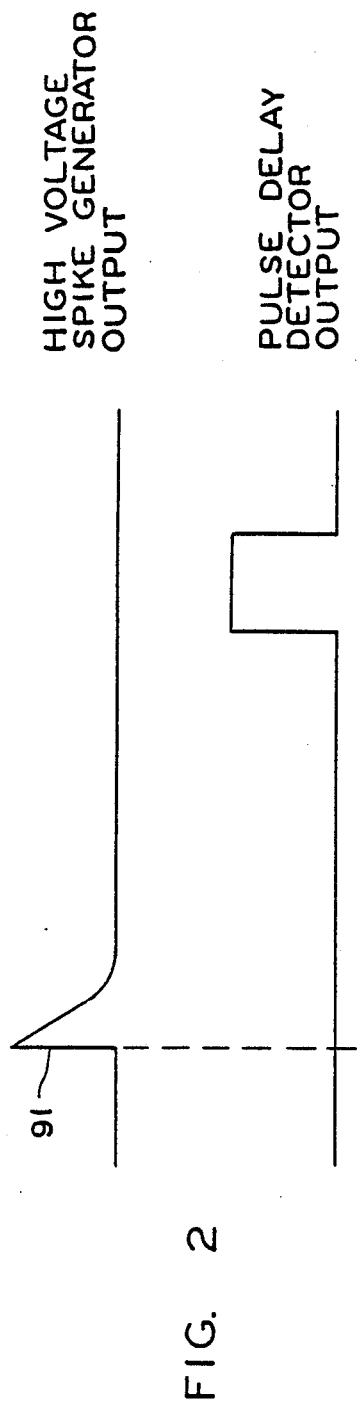
FIG. 2 is a signal diagram showing signals which are used by the system of FIG. 1 to aid in a determination of energy transfer.

A pulse, such as pulse 91 shown in FIG. 2, is supplied by pulse generator 16 to transducers 13 and 14. When an acoustic wave is transmitted in a perpendicular direction to fluid flow, the fluid flow itself has negligible effect on the speed of the acoustic wave. However, the speed of the acoustic wave is affected by the temperature of the fluid according to the following expression (using air moving through a duct as the example):

$$V = \sqrt{\gamma \frac{R}{M} T} \qquad (1)$$

where V is the speed of the acoustic wave in air, $\gamma$ is the ratio of the specific heats of the air, R is the gas constant of the air, M is the molecular weight of the air, and T is the absolute temperture of the air. It is also known that $$V = \frac{L}{t} \quad (2)$$

where V is the speed of the acoustic wave in air, L is the distance of travel of the acoustic wave, and t is the time of propagation of the acoustic wave between transmitter and receiver. From equations (1) and (2), the temperature of the air moving through the duct at the point where it is sensed by the acoustic wave can then be given by the expression $$T = \frac{L^2 M}{t^2 \gamma R} \quad (3)$$

Since the terms L, M, $\gamma$ and R are constants, they can be replaced by a single constant term C to produce the following equation:

$$T = C\frac{1}{t^2}. \quad (4)$$

Therefore, by measuring the time that it takes for the acoustic wave to propagate from the transmitter to the receiver, the temperature of the fluid moving through the duct at that point can be determined.

Figure 5:
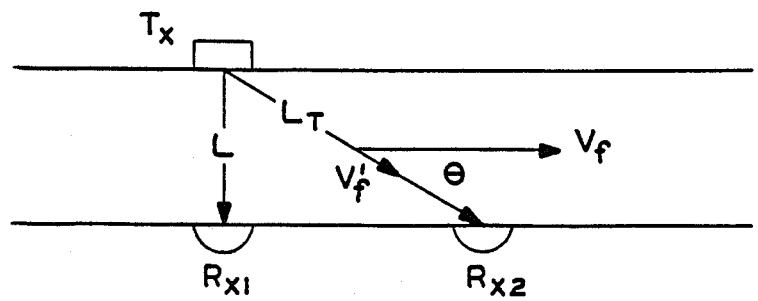
FIG. 5 is a diagram useful in describing how velocity can be determined.

When the acoustic wave does not propagate perpendicularly to the air flow, the air flow affects the speed of the acoustic wave. Thus, as shown in FIG. 5, the cosine of the angle between the direction at which the acoustic wave propagates and the direction of the fluid flowing through the duct can be given by the expression $$\cos\theta = \frac{V_f}{V_{f'}} \quad (5)$$

where $V_f$ is the air flow velocity and $V_{f'}$ is the acoustic wave velocity component due to air flow. The total acoustic wave velocity is given by $$V_T = V_{f'} + V \quad (6)$$

where $V_T$ is the total acoustic wave velocity and V is the acoustic wave velocity with no air flow. From equations (5) and (6), the total acoustic wave velocity can be determined by the expression $$V_T = V_f \cos\theta + V. \quad (7)$$

The velocity of the total acoustic wave, that is the velocity of the wave moving from transmitter $T_X$ to receiver $R_{X2}$, is given by $$V_T = \frac{L_T}{t_T}, \quad (8)$$

where $L_T$ is the distance between the ultrasonic transmitter $T_X$ and the ultrasonic receiver $R_{X2}$, and $t_T$ is the time of propagation between that transmitter and that receiver. If $\theta$ is a 45° angle, equation (7) can be written as $$V_f = \frac{V_T - V}{.707}. \quad (9)$$

The velocity V of the acoustic wave with no air flow can be determined by using the transmitter $T_X$ and the receiver $R_{X1}$ and can be given by the equation $$V = \frac{L}{t} \quad (10)$$

where L is the distance between the transmitter $T_X$ and the receiver $R_{X1}$ and t is the propagation time from that transmitter to that receiver. Equations (8), (9) and (10) can, therefore, be combined in order to determine the air flow velocity as follows:

$$V_f = \frac{\frac{L_T}{t_T} - \frac{L}{t}}{.707}. \quad (11)$$

Since the lengths $L_T$ and L are known between transmitters 13 and 14 and the acoustic receiving transducers 21, 22 and 23 and since the propagation times t between transmitter-receiver pairs 13-21 and 14-22 and the propagation time $t_T$ between transmitter 14 and receiver 23 can be measured, the temperature of the fluid on each side of heat exchanger 12 and the velocity of the fluid moving through duct 11 can be determined.

Thus, as shown in FIG. 1, pulse 91 both causes transducers 13 and 14 to transmit ultrasonic signals to receivers 21, 22 and 23 and enables counters 25, 28 and 30 to begin counting pulses from a high frequency clock generator 26. A delay can be inserted into the enable inputs of counters 25, 28 and 30 to compensate for the pulse delay detector "turn on" time. The acoustic wave traveling from transmitter 13 to receiver 21 will travel with a velocity dependent upon the temperature of the fluid between transmitter 13 and receiver 21. The acoustic signal will, therefore, arrive at receiver 21 at a time dependent upon the temperature and will operate pulse delay detector 24 in a manner to stop counter 25 from counting the pulses from high frequency clock generator 26. Thus, counter 25 will finally yield a count which is representative of the propagation time of the acoustic wave between transmitter 13 and receiver 21 which, as shown in equation (4), can be used to determine temperature. Similarly, counter 28 will be controlled by pulse delay detector 27 and will finally yield a count which is determinative of the temperature of the fluid downstream of heat exchanger 12 and pulse delay detector 29 will operate counter 30 such that counter 30 will have a count which can be used to determine the velocity of the fluid moving through the duct.

It should be noted that if it is not necessary to determine the absolute temperature both upstream and downstream of heat exchanger 12, then a single counter in place of counters 25 and 28 can be used where the counting is initiated by the transducer 21 and 22 which first receives its acoustic wave signal and where the counting is terminated upon receipt of the second acoustic signal by the other transducer. In this manner, the difference in time can be used to indicate the difference in temperature across heat exchanger 12.

Figure 3:
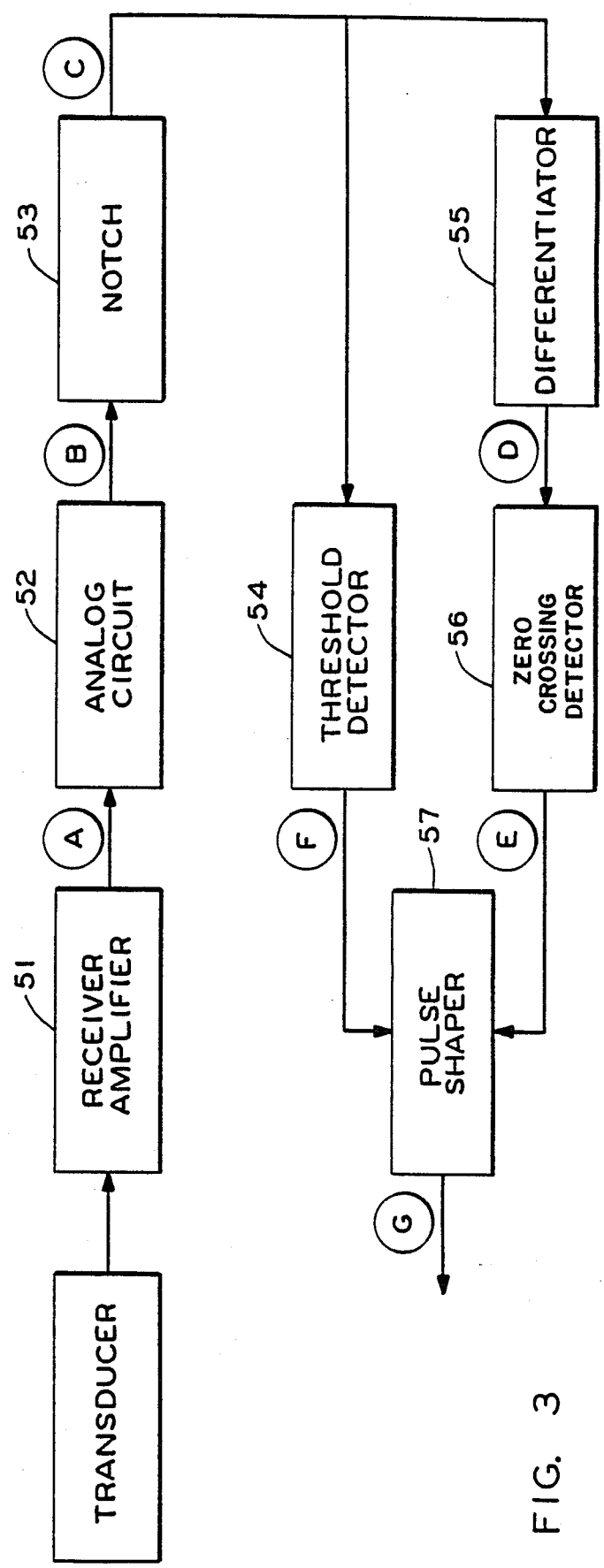
FIG. 3 shows the pulse delay detector of FIG. 1.
Figure 4:
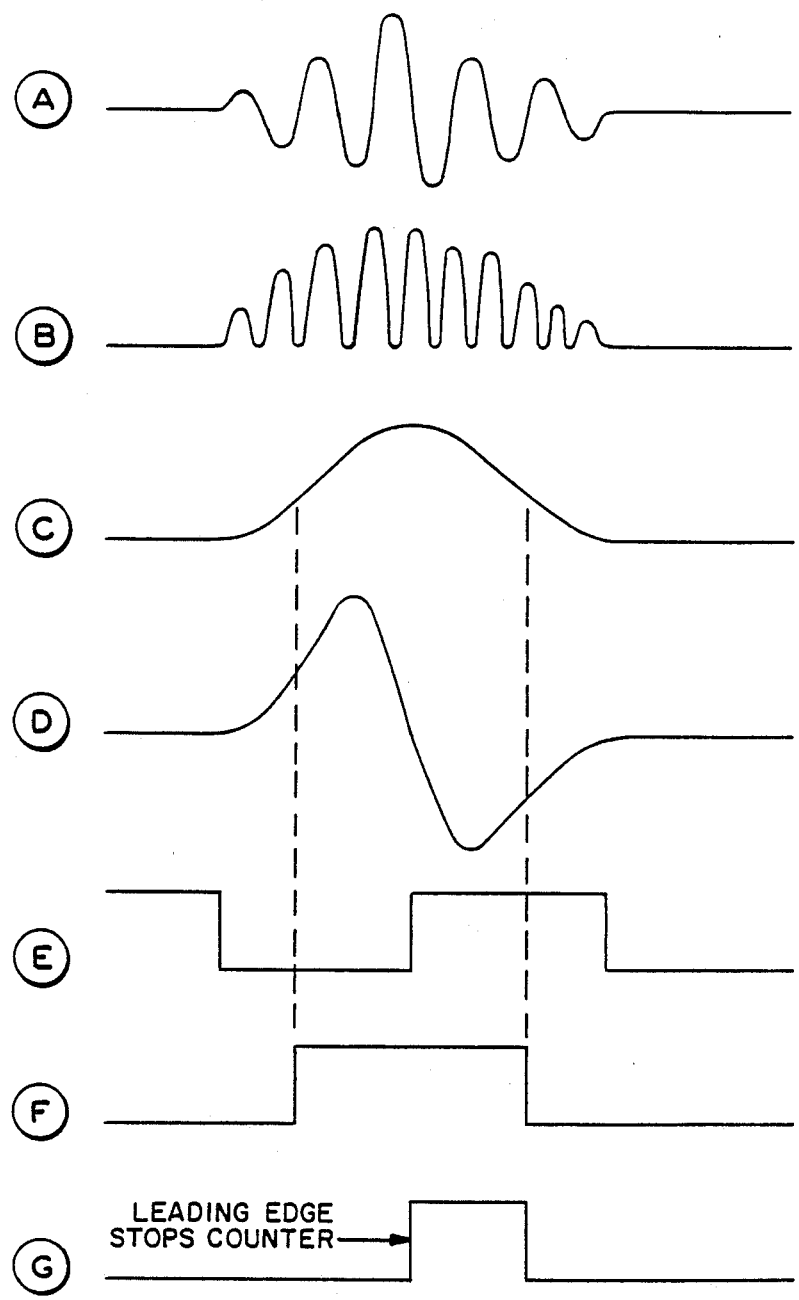
FIG. 4 shows the waveforms in relation to FIG. 3.

FIG. 3 shows the pulse delay detector in more detail. Transmit pulse 91 may, for example, cause a 26 KHz ringing to be transmitted by transmitters 13 and 14 to the receiving transducers. The signal from the receiving transducer is amplified by receiver-amplifier 51 to produce signal A shown in FIG. 4. Signal A is then processed by analog circuit 52, which may be an ICL 8013 multiplier, for level shifting and frequency doubling as shown by waveform B. This signal is filtered by notch filter 53 and then split into two different paths. First, waveform C is supplied to detector 54 for producing waveform F, a squared version of waveform C. Also, waveform C is differentiated at differentiator 55 and processed by zero crossing detector 56 to produce signal E. Both waveforms E and F are supplied to pulse shaper 57 which in effect ANDs E and F to produce signal G. Signal G is then used to stop its respective counter.

In any event, processor 41 receives the outputs from counters 25, 28 and 30 and, using the above equations, can supply a fluid flow velocity signal to mass flow rate register 42 and a temperature difference signal to temperature difference register 43 for indication of the velocity of fluid flow moving through duct 11 and the temperature difference across heat exchanger 12. Processor 41 can also supply an energy signal to BTU per hour register 44 which can then supply an output indication of the BTU per hour energy transfer across heat exchanger 12 or can supply a totalizer 45 which keeps a running sum of the energy transfer.

In order to determine the energy transfer across a heat exchanger, that is the amount of energy imparted to a fluid stream by the heat exchanger, it is desirable to measure the energy level of the air or fluid before and after energy addition (or subtraction) and compute the difference between the two. Thus, this difference can be given by the expression $$Q = mh_1 - mh_2 \quad (12)$$

where Q is the energy transfer in BTU per hour, $h_1$ is the enthalpy of the fluid on one side of the heat exchanger, $h_2$ is the enthalpy of the fluid on the other side of the heat exchanger, and m is the mass flow rate of the fluid moving through the duct. Since enthalpy is a function of both the specific heat of the fluid moving through the duct and temperature, equation (12) can be rewritten as $$Q = mC_p(T_1 - T_2) \quad (13)$$

where $C_p$ is the specific heat of the fluid moving through the duct, $T_1$ is the temperature according to equation (4) on one side of the heat exchanger and $T_2$ is the temperature according to equation (4) on the other side of the heat exchanger. Thus, the signal on counters 25 and 28 can be used to determine the temperature difference $T_1 - T_2$ according to the equation (4) and the count in counter 28 and 30 can be used to determine the mass flow rate or velocity of fluid moving through duct 11 by equation (11). In this manner, the energy transfer across a heat exchanger can be derived.

The embodiments of the invention in which an exclusive property or right is claimed are defined as follows:

1. A system for determining the energy transfer across a heat exchanger mounted in a duct of an air conditioning system, said heat exchanger having an upstream side and a downstream side such that said heat exchanger transfers energy to air moving through said air conditioning duct, said system measuring the energy transferred to said air by said heat exchanger, said system comprising:

ultrasonic transmitter means for transmitting ultrasonic waves through said duct on said upstream and downstream sides of said heat exchanger;

ultrasonic receiver means for receiving said ultrasonic waves on said upstream and downstream sides of said heat exchanger, said receiver means providing signals indicative of the temperature difference between the air upstream and downstream of said heat exchanger and the velocity of air flow through said duct;

processing means connected to said ultrasonic receiver means for determining energy transfer between said heat exchanger and said air based upon said signals indicative of said temperature difference and said velocity;

wherein said ultrasonic transmitter means comprises a first transmitter transducer located upstream of said heat exchanger and a second transmitter transducer located downstream of said heat exchanger; and wherein said ultrasonic receiver means comprises a first receiver transducer located upstream of said heat exchanger and oriented with said first transmitter transducer such that a line between said first transmitter transducer and said first receiver transducer is substantially perpendicular to air flowing through said duct, a second receiver transducer located downstream of said heat exchanger such that a line through said second transmitter transducer and said second receiver transducer is substantially perpendicular to the air flowing through said duct, and a third receiver transducer located such that a line between said third receiver transducer and one of said first and second transmitter transducers is at an angle to said air flowing through said duct.

2. The system of claim 1 wherein said ultrasonic transmitter means comprises a pulse source for generating a transmit pulse to said transmitter transducers for generating pulses of ultrasonic frequency.

3. The system of claim 2 wherein said ultrasonic receiver means comprises delay sensing means for sensing any delay in receiving said ultrasonic waves upstream and downstream of said heat exchanger for determining energy transfer.

4. The system of claim 3 wherein said delay sensing means comprises a high frequency clock, a first counter means connected to said pulse source, to said first receiver transducer and to said high frequency clock for counting clock pulses from said high frequency clock starting with said transmit pulse and terminating with receipt of said ultrasonic wave by said first receiver transducer, a second counting means connected to said pulse source, to said second receiver transducer and to said high frequency clock for counting clock pulses from said high frequency clock starting with said transmit pulse and stopping with receipt of said ultrasonic wave by said second receiver transducer, and a third counting means connected to said pulse source, to said third receiver transducer and to said high frequency clock for counting clock pulses from said high frequency clock starting with said transmit pulse and stopping with receipt of said ultrasonic wave by said third receiver transducer.

5. A system for determining the energy transfer across a heat exchanger mounted in a duct of an air conditioning system, said heat exchanger having an upstream side and a downstream side such that said heat exchanger transfers energy to air moving through said air conditioning duct, said system measuring the energy transferred to said air by said heat exchanger, said system comprising:

ultrasonic transmitter means for transmitting ultrasonic waves across said duct on said upstream and downstream sides of said heat exchanger;

ultrasonic receiver means for receiving said ultrasonic waves on said upstream and downstream sides of said heat exchanger, said receiver means connected to said ultrasonic transmitter means and providing signals indicative of the temperatures of said air upstream and downstream of said heat exchanger and the velocity of air flow through said duct;

processing means connected to said ultrasonic transmitter means and to said ultrasonic receiver means for determining energy transfer between said heat exchanger and said air based upon said signals indicative of said temperature difference and said velocity;

wherein said ultrasonic transmitter means comprises a first transmitter transducer located upstream of said heat exchanger and a second transmitter transducer located downstream of said heat exchanger; and wherein said ultrasonic receiver means comprises a first receiver transducer located upstream of said heat exchanger and oriented with said first transmitter transducer such that a line between said first transmitter transducer and said first receiver transducer is substantially perpendicular to air flowing through said duct, a second receiver transducer located downstream of said heat exchanger such that a line through said second transmitter transducer and said second receiver transducer is substantially perpendicular to the air flowing through said duct, and a third receiver transducer located such that a line between said third receiver transducer and one of said first and second transmitter transducers is at an angle to said air flowing through said duct.

6. The system of claim 5 wherein said ultrasonic transmitter means comprises a pulse source for generating a transmit pulse to said transmitter transducers for generating pulses of ultrasonic frequency.

7. The system of claim 6 wherein said ultrasonic receiver means comprises delay sensing means for sensing any delay in receiving said ultrasonic waves upstream and downstream of said heat exchanger for determining energy transfer.

8. The system of claim 7 wherein said delay sensing means comprises a high frequency clock, a first counter means connected to said pulse source, to said first receiver transducer and to said high frequency clock for counting clock pulses from said high frequency clock starting with said transmit pulse and terminating with receipt of said ultrasonic wave by said first receiver transducer, a second counting means connected to said pulse source, to said second receiver transducer and to said high frequency clock for counting clock pulses from said high frequency clock starting with said transmit pulse and stopping with receipt of said ultrasonic wave by said second receiver transducer, and a third counting means connected to said pulse source, to said third receiver transducer and to said high frequency clock for counting clock pulses from said high frequency clock starting with said transmit pulse and stopping with receipt of said ultrasonic wave by said third receiver transducer.

* * * * *